July 25, 1950

B. P. RAMSAY 2,516,418

EDUCATIONAL DEVICE FOR VISUALLY DEMONSTRATING ATOMIC STRUCTURE

Filed March 14, 1947

Inventor
BEN P. RAMSAY,

By McMorrow, Berman & Davidson
Attorneys

July 25, 1950

B. P. RAMSAY 2,516,418

EDUCATIONAL DEVICE FOR VISUALLY
DEMONSTRATING ATOMIC STRUCTURE

Filed March 14, 1947

Inventor
BEN P. RAMSAY,

By McMorrow, Berman & Davidson
Attorneys

Patented July 25, 1950

2,516,418

UNITED STATES PATENT OFFICE 2,516,418

EDUCATIONAL DEVICE FOR VISUALLY DEMONSTRATING ATOMIC STRUCTURE

Ben P. Ramsay, Powhatan Point, Ohio

Application March 14, 1947, Serial No. 734,774

1 Claim. (Cl. 35—18)

This invention relates to educational devices for teaching the molecular, atomic and electronic theories of chemical substances.

An object of the invention is to provide an educational device whereby the student may be taught visually the molecular, atomic and electronic theories of chemical substances.

Another object of the invention is to provide an educational device for demonstrating how electrons are shared in non-polar compounds.

A further object of the invention is to provide an educational device comprising a plurality of rotatable discs, each having mounted thereon a plurality of electric light sources to represent atomic structure, said discs being mutually cooperative to illustrate visually electron sharing.

Still another object of the invention is to provide an educational device of the character described, which is simple in design, inexpensive to manufacture, and which is effective for the intended educational purpose.

Other objects and advantages of the invention will become apparent from the following description of a preferred embodiment thereof as illustrated in the accompanying drawings, and in which, Figure 1 is a front elevational view of my improved educational device.

Figure 1:
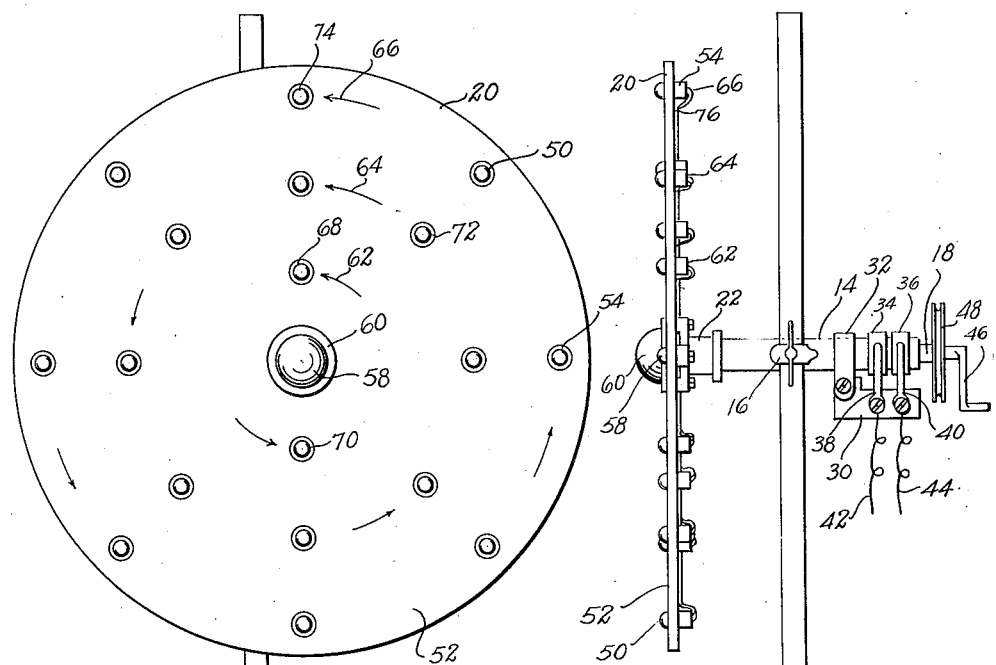
Figure 1:
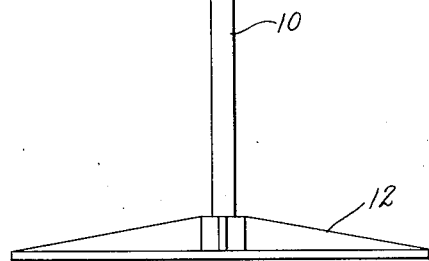

In the teaching of the structure of matter, it becomes necessary to clarify many parts of the molecular, atomic and electronic theories by an explanation, and by the use of something tangible to represent the minute parts of atoms and molecules. The Bohr theory assumes that the planetary electrons rotate in orbits about the nucleus, much as the planets of the solar system revolve about the sun. The orbit nearest the nucleus can hold no more than two electrons. The second and third orbits cannot hold more than eight electrons each. Orbits beyond these can hold increasingly greater numbers of electrons. In all cases of an incomplete outermost orbit, the atom tends to gain or lose electrons to form a stable arrangement.

When two elements combine to form a compound, the union is assumed to result from the mutual lending and borrowing of electrons, so that each atom has a complete outer orbit after the combination. Substances formed by the lending and borrowing of electrons are called polar compounds. The valence of an element is the number of electrons which its atom must borrow or lend to form a complete outer orbit, the electrons in the incompleted orbit being often referred to as valence electrons.

The present invention provides means for teaching graphically and visually the theories of atomic structure which have been very briefly summarized above. In order to understand clearly the nature of the invention, and the best means for carrying it out, reference may now be had to the drawings, in which like numerals denote similar parts throughout the several views.

As shown, there is a post 10 supported in upright position by a base 12. A hollow tubular bearing 14 is secured to the post 10 in any suitable manner such as by means of a clamp 16, as shown best in Figure 2. A hollow tubular shaft 18 extends through said bearing 14, and is rotatable therein about their common axis.

Figure 4:
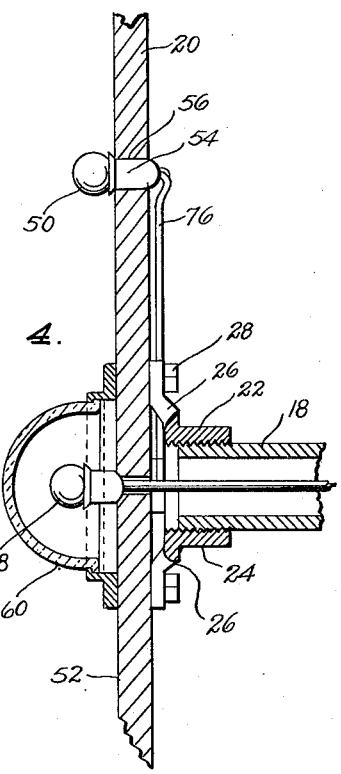
Figure 4 is a fragmentary sectional elevation taken on line 4—4 of Figure 3.

A disk 20, formed of any suitable material such as plywood or the like, is supported coaxially with the shaft 18 by means of a coupling 22 the hub 24 of which is threaded upon one end of the shaft 18, as seen best in Figure 4, and the flanges 26 of which are secured to the rearward face of the disk 20 by means of screws or bolts 28. The disk 20 is thus rotatable with the shaft 18.

Figure 2:
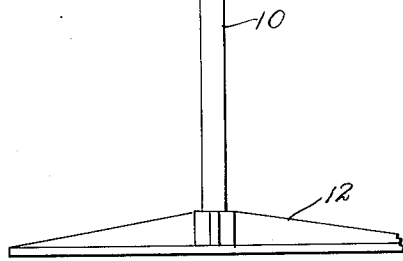
Figure 2 is a right side elevational view of the device shown in Figure 1.
Figure 3:
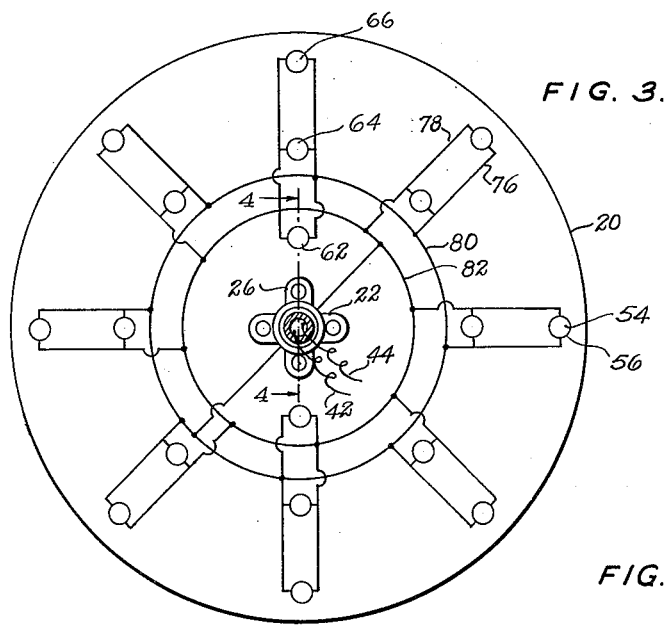
Figure 3 is a rear elevational view of the device, as seen from the right side of Figure 2, showing the wiring of the device.

An insulating bracket 30 is secured to the bearing 14 by means of a clamp 32, as best shown in Figure 2. A pair of slip rings 34 and 36 are secured coaxially to the right hand end portion of the shaft 18 as seen in the view, both slip rings being preferably insulated from the shaft. Spring contact fingers 38 and 40 are secured at one end to the insulating bracket 30, and have their free ends bearing against the slip rings 34 and 36 respectively. Current is conducted from a suitable source to the spring contact fingers by means of wires 42 and 44.

The shaft 18 and its attached disk 20 may be rotated about their common axis by means of a crank handle 46 attached to the right hand end of the shaft 18, as shown in Figure 2, or by means of power supplied to a pulley wheel 48 keyed upon the shaft 18.

A number of electric lamps 50 are mounted upon the outer surface or face 52 of the disk 20, so as to be visible thereon, the lamps being preferably mounted in sockets 54 which are seated securely in apertures 56 formed in the disk 20. There is a central lamp located at 58 and covered with a transparent cover or housing 60 preferably of some distinctive and suggestive color such as red. There are also lamps arranged in three concentric circular orbits 62, 64 and 66. The inner orbit 62 has two lamps located thereon at locations 68 and 70 which are thus spaced from each other angularly by 180 degrees.

The next outer orbit 64 has a total of eight lamps located thereon as at 72 and spaced from each other angularly by 45 degrees. The outermost orbit 66 also has a total of eight lamps located thereon, as at 74, and spaced from each other angularly by 45 degrees, and in radial alignment with the lamps of the next inner orbit 64.

Each of the lamp sockets on the disk 20 is connected by its two lead wires 76 and 78 to two circular connecting rings 80 and 82 which are insulated from the disk 20 and from each other. All the lamp sockets are thus connected in parallel. The connecting rings 80 and 82 are connected by suitable wires extending through the hollow tubular shaft 18, to the slip rings 34 and 36 respectively, thus allowing current from the power wires 42 and 44 to flow to the lamps on the disk through the spring contact fingers 38 and 40.

The illuminated lamps may be all colored gold except the center lamp 58, the housing 60 of which is preferably colored some distinctive color such as red, to represent the nucleus of the atom. In using the device, all the gold colored bulbs are first removed from the disk 20, so that only the central bulb 58 remains lighted. The room is darkened. The face of the disk 20 may be painted black so as to be invisible in the darkened room.

The red hemisphere 60 represents the nucleus of an atom. A gold-colored bulb is placed in one of the two sockets 68 or 70 nearest the nucleus. The hydrogen atom is now represented, since hydrogen has but one planetary electron. By rotating the disk 20, the motion of the electron about the nucleus may be demonstrated. By the addition of another bulb to the first orbit 62, making a total of two bulbs therein, the helium atom is represented. By the addition of one bulb at a time so that the sockets are filled from the center outward, that is, by never adding a bulb to the next outer orbit until all sockets have been filled in the last inner orbit, any atom from hydrogen to argon inclusive may be represented. The gold-colored bulbs represent planetary electrons.

When the disk is rotated with bulbs in the orbits, the orbits appear as colored, concentric circles about the nucelus. For another demonstration of the device, the magnesium atom may be represented by placing twelve bulbs in the orbits. There will be two in the first, eight in the second and two in the third. It is readily observed that the third orbit does not contain half the number of electrons necessary to complete it. Therefore this atom will lend two electrons when it enters into chemical combination. It is a metal because it loses electrons.

Since it loses two electrons, its valence is plus 2. It has two valence electrons. It will probably combine with an atom such as oxygen which has six electrons in its outer orbit. Oxygen has a valence of minus two, since it needs two electrons to complete its orbit. The compound magnesium oxide is formed by this combination.

By counting the planetary electrons of an atom being demonstrated by this device, the atomic number as well as the number of the element may be calculated. For example, an atom with thirteen planetary electrons has the atomic number thirteen and is element number thirteen. Since the number of protons in the nucleus equals the number of planetary electrons, the positive charge on the nucleus becomes readily apparent to the student.

It is assumed that the nucleus contains all the protons and a number of neutrons about equal to the number of protons. Since the proton is 1835 times as heavy as the electron, the weight of the atom is nearly equal to the weight of its protons. Therefore the approximate atomic weight of the atom may be calculated, according to the rule that two times the number of planetary electrons equals approximately the atomic weight of the element.

Another kind of chemical combination may occur by atoms sharing one or more pair of electrons.

Figure 5:
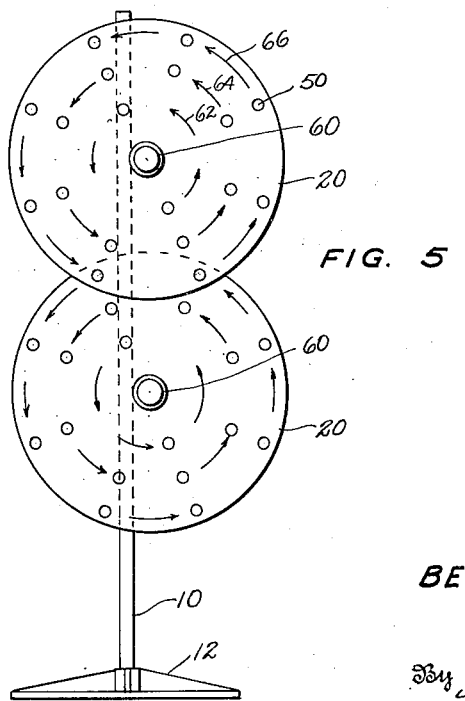
Figure 5 is a front elevational view of a modified form of the device, employing two rotatable discs instead of one as was shown in Figure 1.

Two or more of the devices may be supported on the same post 10, as shown in Figure 5, one below the other, with their margins overlapping as illustrated, their pulleys 48 being belted together to demonstrate the formation of compounds by atoms sharing electrons. For example, the chlorine molecule consists of two atoms. Before combining, each atom has seven electrons in its outer orbit. On combining, the two atoms of chlorine share one pair of electrons, and each atom has a complete outer orbit of eight electrons. By clamping the two devices to the same ring stand 10, with one disk lighted to represent an atom of chlorine slightly in front of the other disk lighted in a like manner, the disks may be made to overlap as shown in Figure 5.

When properly adjusted and synchronized, the outer orbit of each atom is completed when the disks are rotated. The formation of other non-polar compounds may also be demonstrated in a like manner. The number of chemical combinations that may be pictured by using two or more such devices, is practically unlimited.

Although I have described a preferred embodiment of my invention in specific terms, it is to be understood that various changes may be made in size, shape, materials and arrangement without departing from the spirit and scope of the invention as claimed.

I claim:

An educational device comprising a support, a pair of rotatable disks positioned longitudinally of said support, said discs being spaced from each other with the marginal portions thereof in overlapping relation, each of said disks being mounted for rotation about a horizontal axis, there being concentrically spaced orbital circles of openings disposed about each disk, visual means carried within the openings of one of said disks for graphically representing the electron structure of a first element, visual means carried within the openings of the other of said disks for graphically representing the electron structure of a second element, and means operatively connected to said disks for affecting the rotation thereof, said disks having their peripheral portions overlapping each other to an extent such as to provide for the intersection of the outermost circle of openings of the first and second disks upon rotation thereof to thereby visually represent the formation of a compound by the sharing of electrons between said first and second-named elements.

BEN P. RAMSAY.

REFERENCES CITED

The following references are of record in the file of this patent:

UNITED STATES PATENTS

| Number | Name | Date |
|---|---|---|
| 452,650 | Randall | May 19, 1891 |
| 2,477,179 | Hart | July 26, 1949 |

OTHER REFERENCES

Catalogue of the Chicago Apparatus Co., Supplement No. 146, published by Chic. Appar. Co., 1735–43 N. Ashland Ave., Chic., Illinois, page 2.